J. M. DIXON & H. T. HERRON.
Bee-Hive.
No. 219,626. Patented Sept. 16, 1879.
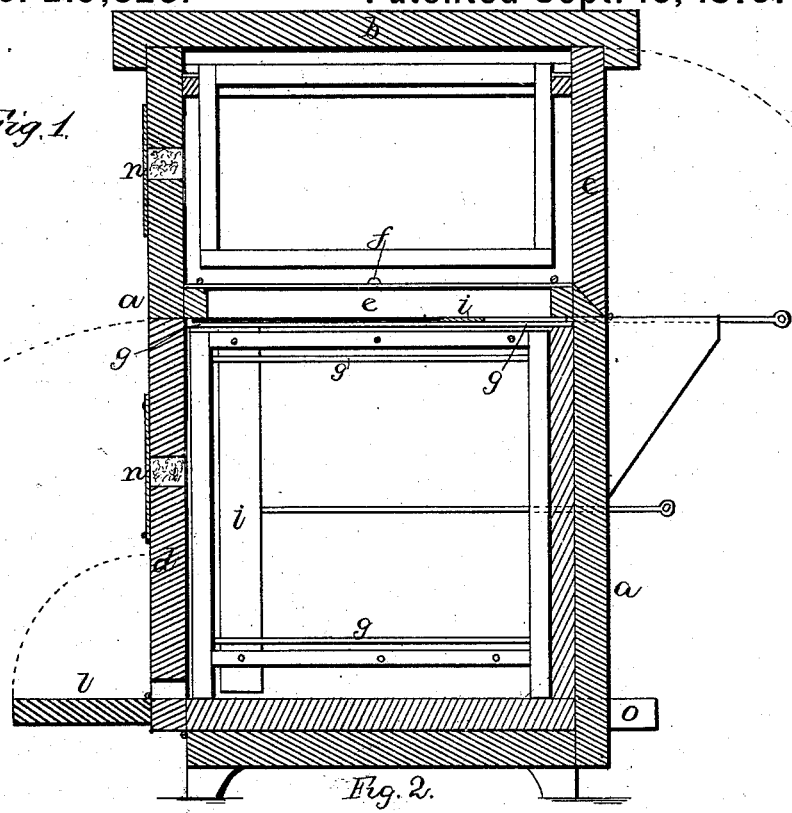
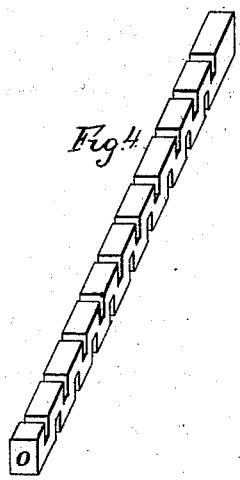
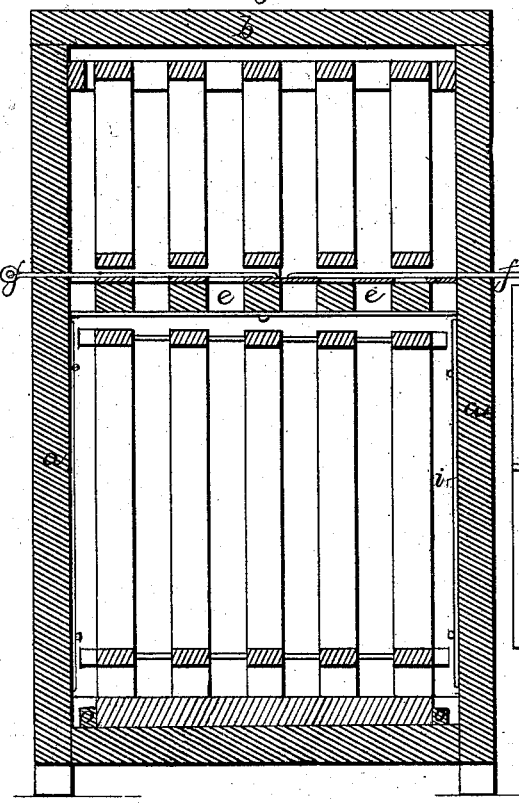

UNITED STATES PATENT OFFICE.

JAMES M. DIXON AND HIRAM T. HERRON, OF DIXON, KENTUCKY.

IMPROVEMENT IN BEE-HIVES.

Specification forming part of Letters Patent No. 219,626, dated September 16, 1879; application filed April 21, 1879.

*To all whom it may concern:*

Be it known that we, JAMES MADISON DIXON and HIRAM TAYLOR HERRON, of Dixon, in the county of Webster and State of Kentucky, have invented certain new and useful Improvements in Bee-Hives; and we do hereby declare the following to be a full, clear, and exact description of the invention, such as will enable others skilled in the art to which it pertains to make and use it, reference being had to the accompanying drawings, which form part of this specification.

Our invention relates to an improvement in bee-hives; and it consists in the peculiar arrangement and combination of parts, whereby a cheap, simple, and effective hive is produced, as will be more fully described hereinafter.

Figures 1 and 2 are vertical sections of our invention, and Figs. 3 and 4 are detail views of the knives and moth-trap.

*a* represents the frame, of any desired construction, and which is provided with the removable cover *b* and the two doors *c d*, on opposite sides. Both of these doors are hinged at their lower edges, so as to drop downward, and thus form a table or support upon which the comb-frames can be drawn out for inspection.

Through the partition *e*, which separates the upper and lower chambers, are made a number of slots for the bees to pass through, and passing through opposite sides of the hive are the two rods *f*, which have a number of slides connected to them, corresponding to the slots.

By moving these rods the slides may be made to cover over the slots or open them at will, and thus the bees may be confined to one chamber or freely admitted to both, as may be desired.

As it is desirable to inspect the lower combs at times, and as the bees nearly always glue the combs to the insides of the frame, so that it is very difficult, if not impossible, to draw them out without injuring them, wire guides *g* are placed on the under side of the partition, and on opposite sides of the lower chamber, and in these guides a knife, *i*, connected to a rod that projects through the side of the frame, is made to slide, so as to cut through the wax, and thus allow the comb-frames to be fully drawn out at any time. These hives are of the greatest service, and do away with much trouble and annoyance.

To the lower edge of the lower door, *d*, is hinged the lighting-board *l*, which can be let down in the day and closed up at night, so as to prevent moths from getting into the hive.

This feature of having the board hinged is also very convenient in transportation, as it can be folded up out of the way, and thus not run the risk of being broken off, and for keeping the bees in the hive.

Through the sides of the hive are made a number of ventilation-holes, which are covered over on their insides with a wire-gauze, and on their outsides by the slides *n*.

During the winter these holes will be packed with cotton or other similar material, so as to protect the bees from cold.

Passed into the hive, at its lower corners, on opposite sides, are the two sticks *o*, which extend across the hive, and have two series of notches made in them, at right angles to each other.

The moths lay their eggs in these notches, and as the ends of the sticks project beyond the sides of the hive, they can be drawn out at any time and the eggs destroyed. These sticks form moth-traps.

Having thus described our invention, we claim—

In a bee-hive, the guides *g*, secured to each end of the frame, in combination with the knife *i*, provided with a handle, which extends through the side of the frame, whereby the knife forms a permanent attachment to the hive, and the frames can be cut loose, substantially as shown.

In testimony that we claim the foregoing we have hereunto set our hands this 14th day of April, 1879.

J. M. DIXON.
H. T. HERRON.

Witnesses:
J. E. HUNTER,
A. W. MOONEY.